Figure 1:
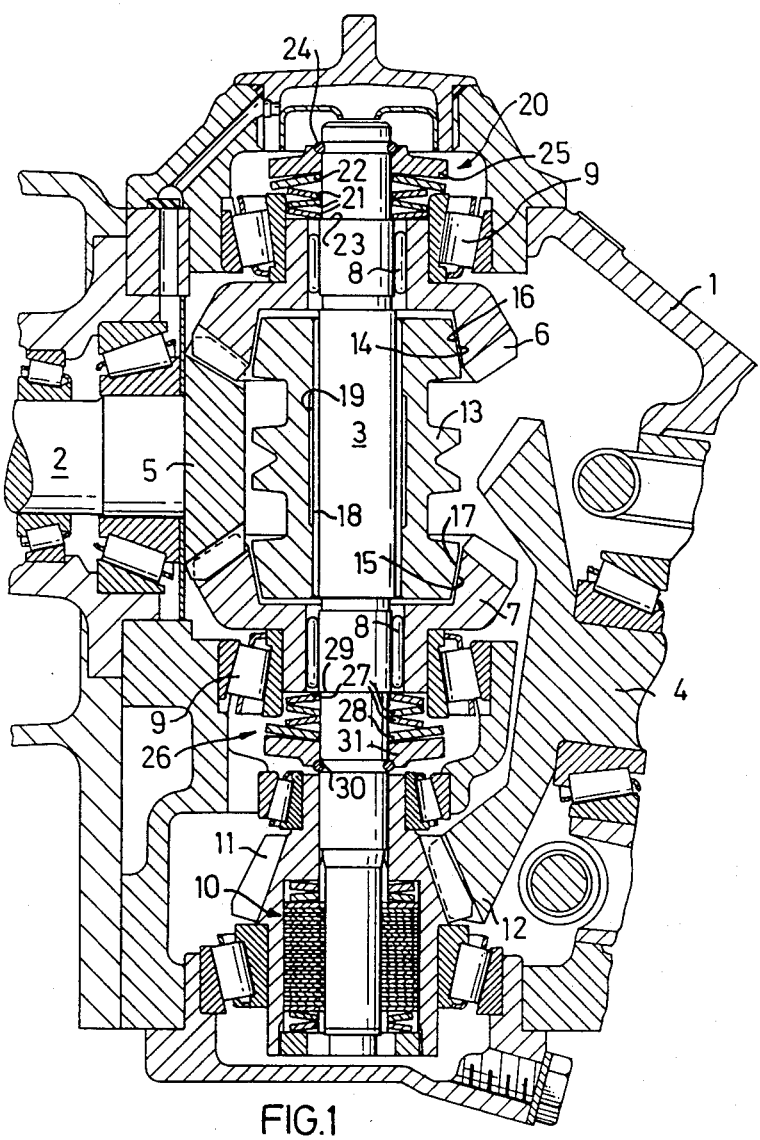

United States Patent [19]

Hallenstvedt

[11] Patent Number: 4,474,072
[45] Date of Patent: Oct. 2, 1984

[54] TRANSMISSION, ESPECIALLY FOR BOAT MOTORS

[75] Inventor: Oddbjörn Hallenstvedt, Köping, Sweden

[73] Assignee: AB Volvo Penta, Gothenburg, Sweden

[21] Appl. No.: 353,898

[22] Filed: Mar. 2, 1982

[30] Foreign Application Priority Data

Mar. 5, 1981 [SE] Sweden ............................. 8101424

[51] Int. Cl.³ .................... F16H 3/14; F16D 11/06
[52] U.S. Cl. .............................. 74/378; 74/355; 192/21
[58] Field of Search ............... 74/321, 355, 376, 378, 74/379, 416, 423, 409, 440; 192/109 R, 109 A, 192/30 V, 67 R, 51, 21, 48.1, 70.17; 75/440

[56] References Cited

U.S. PATENT DOCUMENTS

| 1,185,875 | 6/1916 | Coldwell | 74/321 |
| 3,165,005 | 1/1965 | Bergonzo | 74/378 |
| 3,659,474 | 5/1972 | Neugebauer | 74/440 |
| 3,915,270 | 10/1975 | Miller | 74/378 |
| 3,944,036 | 3/1976 | Koshelev | 192/109 A |
| 4,294,159 | 10/1981 | Wendler et al. | 74/409 |
| 4,397,198 | 8/1983 | Borgersen et al. | 74/355 |

FOREIGN PATENT DOCUMENTS

| 2146683 | 3/1973 | Fed. Rep. of Germany ... | 192/109 A |
| 1497706 | 1/1978 | United Kingdom | 74/409 |

Primary Examiner—Allan D. Herrmann
Assistant Examiner—Bruce F. Wojciechowski
Attorney, Agent, or Firm—Young & Thompson

[57] ABSTRACT

Transmission, especially for boat motors, with a shift mechanism in which an amplification of the clutch force is achieved by threaded engagement of the gear-engaging sleeve with the associated shaft. The transmission has shock and oscillation absorbers built into the housing, comprising a pair of sets of cup springs which can be disposed between said shaft and the gears to provide limited axial displacement of the shaft relative to the gears against the force of the springs when the sleeve is rotated relative to the shaft.

7 Claims, 3 Drawing Figures

TRANSMISSION, ESPECIALLY FOR BOAT MOTORS

The present invention relates to a transmission, especially for boat motors, comprising an input shaft and an output shaft and a reverse gear arrangement acting between them, which has a pair of gears which are provided with clutch members, are freely rotatably mounted on a shaft, and which can be selectively locked to said shaft by means of an engaging sleeve provided with corresponding clutch members and displaceable on said shaft, to establish torque transmission between the input shaft and the output shaft. Said engaging sleeve has internal screw threads in engagement with external screw threads on its shaft to provide increasing clutch force with increasing torque.

In all transmissions of the above-mentioned type, and especially in those which are used together with few-cylinder marine diesels, it is desirable to arrange some form of shock and oscillation absorption to, firstly, absorb energy and reduce the shock when engaging the forward or reverse gear and, secondly, dampen the noise in the transmission occurring especially when idling few-cylinder diesels, which is not only disturbing but wears the active clutch members.

The most common type of shock and oscillation absorbers consist of a pair of drivers with flexible spacers of rubber for example, coupled between the motor and the transmission. In this type of absorber, it is often not possible to achieve the elasticity desired for use with few-cylinder diesels, and therefore the dampening effect is insufficient. Placement between the motor and the transmission is furthermore disadvantageous for marine use because of the demanding environment.

The purpose of the present invention is to achieve a transmission of the type described in the introduction into which a new type of shock and oscillation absorber is built, which eliminates the above-mentioned disadvantages.

This is achieved according to the invention by the spring means being disposed to permit, after engagement of either gear, limited axial relative movement between the threaded portion of the engaging sleeve and the threaded shaft to provide shock and oscillation absorption.

By using for the absorbing function in the invention components which are already present in the transmission, an absorber is achieved which works in the transmission oil bath and which can be made by installing very few additional components into a conventional transmission. Sufficient elasticity is provided by using the screw movement of the clutch, which provides relatively great twisting between the input and output shafts with small axial relative movement between the threaded portion of the engaging sleeve and the threaded shaft. Furthermore, the absorber has a very advantageous placement by being in the immediate vicinity of the clutch members.

The invention will be described in more detail with reference to the examples shown in the accompanying drawings.

Figure 2:
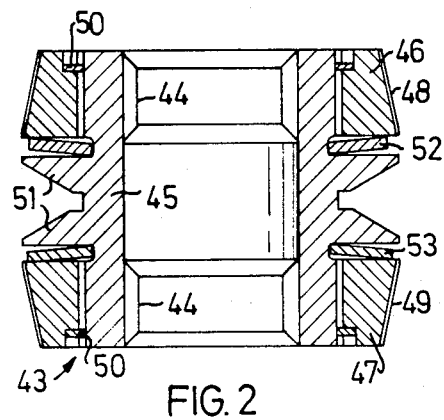
Figure 3:
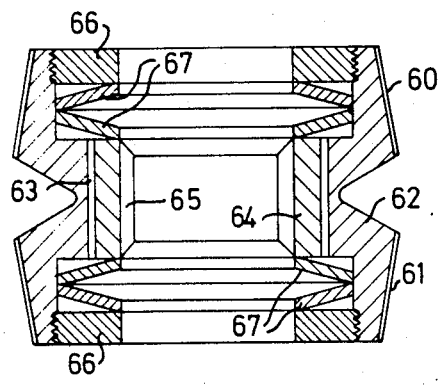

FIG. 1 shows a longitudinal section through a boat transmission with an absorber device according to the invention, FIG. 2 shows a longitudinal section through a clutch sleeve in a modified embodiment, and FIG. 3 shows a longitudinal section through an engaging sleeve according to another modified embodiment.

The transmission shown in FIG. 1 has a housing 1 in which an input shaft or a primary shaft 2, an intermediate shaft or a secondary shaft 3 and an output shaft 4 are rotatably mounted. The input shaft carries a conical pinion 5 which engages two conical gears 6,7 which are freely rotatably mounted in needle bearings 8 on the intermediate shaft 3 and in roller bearings 9 in the housing. The intermediate shaft 3 is joined via a torque-limiting coupling 10 to a conical gear 11 which engages a conical gear 12 on the output shaft 4.

On the intermediate shaft 3 an engaging sleeve 13 is displaceably mounted that has friction surfaces 14,15 which, when the sleeve 13 is displaced axially by means of operating means (not shown here), can be brought into engagement with friction surfaces 16,17 on the gears 6 and 7 respectively, to non-rotatably join the gears 6 or 7 to the intermediate shaft 3. The engaging sleeve 13 is provided in a known manner with internal screw threads 18 which engage a corresponding external screw thread 19 on the intermediate shaft 3, so that rotation of the sleeve on the shaft results in axial displacement of the sleeve 13. The threads are directed so as to provide increasing engagement force between the frictional surfaces 14,15 and 16,17 respectively of the gears and the engaging sleeve.

At its upper end, immediately above the gear 6, the intermediate shaft 3 has a set 20 of cup springs, comprising three small cup springs 21 and a larger cup spring 22, which are tensioned between a shoulder 23 on the shaft 3 and an abutment 25 fixed by a lock ring 24. A corresponding set 26 of cup springs, comprising three small cup springs 27 and a larger cup spring 28, is tensioned between a shoulder 29 and an abutment 31 fixed by a lock ring 30 immediately beneath the gear 7. The described arrangement permits the shaft 3 to be axially displaced in either direction relative to the gear 6 and 7 against the spring force of the spring sets 20 and 26, which will then be in contact with the adjacent end surface of the gear 6 or 7, respectively.

The shock and oscillation absorbing function is achieved by virtue of the fact that the torque generated during engagement gives rise, because of the screw engagement between the engaging sleeve 13 and the shaft 3, to an axial force component acting to produce axial relative movement between the sleeve 13 and the shaft 3 against the force of the spring set 20 or 26 depending on which gear 6,7 is engaged. In the embodiment shown in FIG. 1, the absorption takes place by axial displacement of the shaft 3 relative to the gear 6,7. A given torque corresponds to a given axial position and a given angle of twist between the input and the output shafts. By combining various cup springs in the spring sets 20,26 it is possible to achieve in a simple manner the desired torque characteristic. The friction in the screw connection and between the clutch members provides a hysteresis effect and dampening of torsional vibrations.

FIG. 2 shows an engaging sleeve 43 which, together with an axially fixed intermediate shaft, provides the absorbing function described above. The sleeve 43 consists of a threaded 44 cylinder portion 45 on which a pair of clutch members 46,47 with frictional surfaces 48,49 are displaceably but non-rotatably mounted by means of splines. A pair of lock rings 50 holds the clutch members in place on the sleeve. Between the clutch members 48,49 and a pair of central flanges 51 on the sleeve portion 45, there is a pair of cup springs 52,53 corresponding to the spring sets 20,26. The function is analogous to the embodiment shown in FIG. 1 with the difference that the sleeve portion 45 is displaced, instead of the intermediate shaft, relative to the gears 6,7 during engagement.

FIG. 3 shows an additional embodiment of the device according to the invention. Here frictional surfaces 60,61 are disposed on a common sleeve member 62 which is displaceably but non-rotatably mounted on an inner sleeve 64 which is internally threaded 65 for engagement with the threads on an axially fixed intermediate shaft, in accordance with the embodiment shown in FIG. 2. There are stop plates 66 screwed into both ends of the member 62, and cup springs 67 are tensioned between these plates and the inner sleeve. The basic functional principle of the engaging sleeve in FIG. 3 is analogous to that in FIG. 2, but the embodiment in FIG. 3 provides a longer spring path for the same length of engaging sleeve and has the advantage of having the groove for the disengaging mechanism in a defined position in relation to the frictional surfaces.

Other embodiments are also possible within the scope of the following patent claims. For example, the invention is not limited to friction clutches but can also be used in reversing mechanisms in jaw clutches.

I claim:

1. In a transmission, especially for boat motors, comprising an input and an output shaft and a reverse gear arrangement acting between them, which has a pair of gears which are provided with clutch members, are freely rotatably mounted on a shaft and which can be selectively locked to said shaft by means of an engaging sleeve provided with corresponding clutch members and displaceable on said shaft, to establish torque transmission between the input shaft and the output shaft, said engaging sleeve having internal screw threads in engagement with external screw threads on its shaft to provide increasing clutch force with increasing torque; the improvement comprising spring means disposed to permit, after engagement of either gear, limited axial relative movement between the threaded portion of the engaging sleeve and the threaded shaft against the action of said spring means to provide shock and oscillation absorption.

2. Transmission according to claim 1, in which the spring means are cup springs arranged concentrically with the threaded shaft.

3. Transmission according to claim 1 in which the clutch members of the engaging sleeve are rigidly joined to the threaded portion of the sleeve, the threaded shaft being journalled for limited axial movement in the transmission housing against the force of said spring means acting between the shaft and axially fixed members.

4. Transmission according to claim 3, in which said spring means are formed of two sets of cup springs, each set being tensioned on the shaft against the side of the respective gear facing the respective shaft end.

5. Transmission according to claim 1 in which the threaded portion of the engaging sleeve carries clutch members which are journalled for limited axial displacement relative to said threaded portion against the force of said spring means arranged thereon.

6. Transmission according to claim 5, in which said clutch members are individually axially displaceable relative to said threaded portion and relative to each other.

7. Transmission according to claim 5, in which said clutch members are integral with each other and are conjointly axially displaceable relative to said threaded portion.

* * * * *